H. J. SCHAEFER & P. J. MILLER.
MILK STRAINER.
APPLICATION FILED MAR. 22, 1917.
1,280,865.
Patented Oct. 8, 1918.
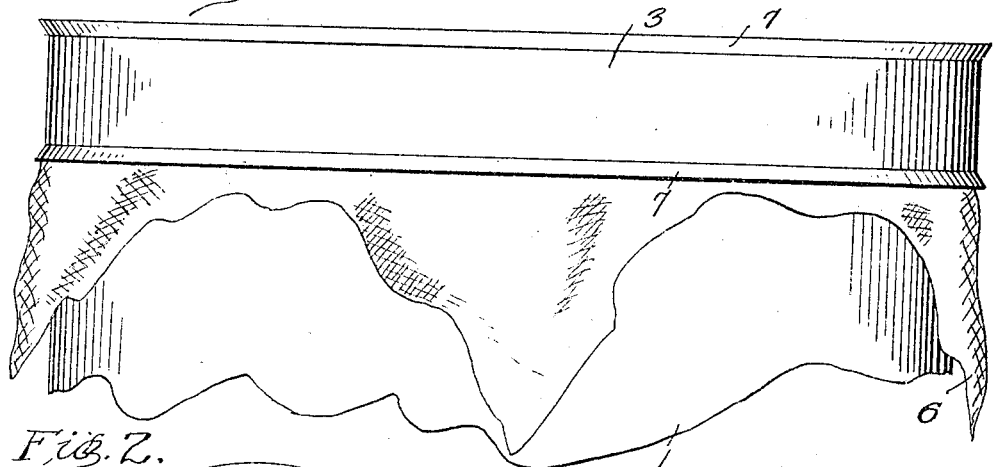
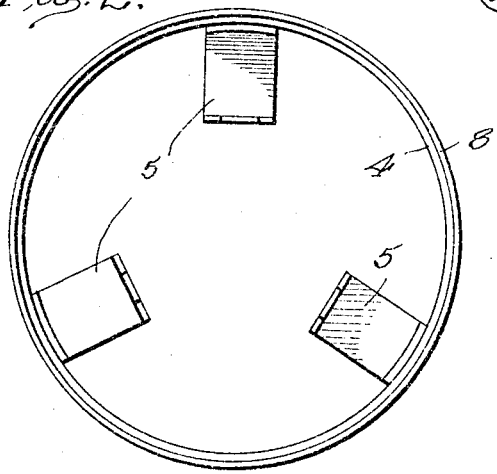
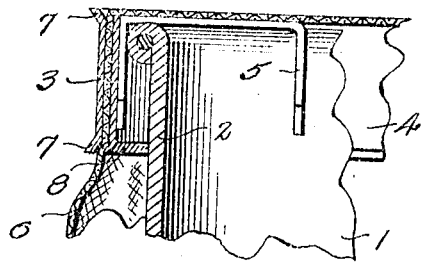
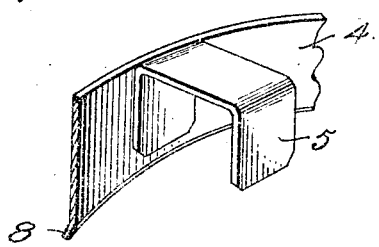
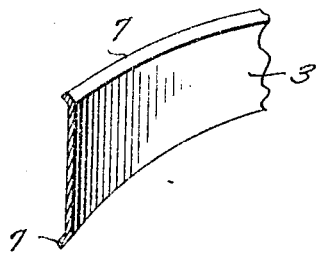
Inventors
P. J. Miller and
H. J. Schaefer
their Attorneys

UNITED STATES PATENT OFFICE.

HENRY J. SCHAEFER AND PETER J. MILLER, OF SHERWOOD, WISCONSIN.

MILK-STRAINER.

1,280,865.     Specification of Letters Patent.     Patented Oct. 8, 1918.

Application filed March 22, 1917. Serial No. 156,742.

*To all whom it may concern:*

Be it known that we, HENRY J. SCHAEFER and PETER J. MILLER, citizens of the United States of America, residing at Sherwood, in the county of Calumet and State of Wisconsin, have invented certain new and useful Improvements in Milk-Strainers, of which the following is a specification, reference being had therein to the accompanying drawing.

This invention relates to a milk strainer and has for its principal object the production of a strainer which may be efficiently placed upon various size milk cans.

Another object of this invention is the production of a strainer which may be easily taken apart for cleaning purposes.

A still further object of this invention is the production of a strainer which will allow the cloth to hang down over the side of the can so as to keep undesirable objects out of said can.

With these and other objects in view, this invention consists of certain novel combinations, constructions and arrangements of parts as will be hereinafter fully described and claimed.

In the accompanying drawings:

Figure 1 is a fragmentary side elevation of a can showing the strainer attached thereto.

Fig. 2 is a top plan view of the strainer frame.

Fig. 3 is a fragmentary vertical section taken through a milk can and the strainer.

Fig. 4 is a fragmentary perspective view showing how the hanger clips are attached to the inner rim.

Fig. 5 is a fragmentary perspective view of the outer rim.

By referring to the accompanying drawing, it will be seen that 1 designates an ordinary milk can which is provided with a neck 2 upon which neck 2 is adapted to be placed applicant's invention which consists of an outer rim 3 which telescopes over the inner rim 4. Upon the inner rim 4 is provided the plurality of hanging clips 5. By referring to Fig. 4, it will be seen that these hanging clips 5 are substantially U-shaped and are carried upon the inner face of the rim 4 by means of solder or other suitable means. These clips 5 are adapted to hang over the neck 2 of an ordinary milk can as is illustrated in Fig. 3. It will be seen by the construction of these clips 5, that the strainer will fit different size milk cans without any necessary displacement.

In using this device, the inner rim 4 is first placed upon the neck of a can and the strainer cloth 6 is placed over the rim 4 so that it will hang over the neck of the can as is shown in Fig. 1. The outer rim 3 is then placed over the cloth so that the same will be securely held in its proper position.

By referring especially to Fig. 5, it will be seen that the outer rim 3 is provided with the flared edges 7 from which construction it will be seen that the rim may be placed in its position very easily and will not tear the strainer cloth 6. The inner rim 4 is provided with the bottom flared edge 8 as is clearly shown in Fig. 4. The purpose of this flared edge 8 is to prevent the outer rim 3 from slipping down too far. It will be seen by referring to Fig. 3 that this flared edge 8 is abutted by the flared edge 7 in such a manner that the strainer cloth 6 will be held in a tightened position.

From the above description, it will be seen that a device has been produced which will efficiently fit various size cans without any adjustment being necessary. It will also be seen that the device may be easily cleaned and is constructed in such a manner that the edges of the cloth will hang over the neck of the can so that the strainer will act as a sanitary cover.

What is claimed is:

As a new article of manufacture a milk strainer comprising an outer ring and an inner ring said outer ring comprising a vertical outer wall having outwardly inclined flanges along its upper and lower edges said inner ring comprising a vertical wall having an outwardly inclined lower edge, said inner ring provided with a plurality of substantially U-shaped hanger brackets secured to the inner face thereof, said hanger brackets being of material length for permitting said inner ring to fit upon receptacles of varying sizes and said outer ring adapted to firmly clamp a strainer
5 cloth against sagging, the lower inclined flange of said outer ring being also adapted to firmly clamp a strainer cloth against the lower inclined edge of said inner ring.

In testimony whereof we hereunto affix our signatures.

HENRY J. SCHAEFER.
PETER J. MILLER.

Copies of this patent may be obtained for five cents each, by addressing the "Commissioner of Patents, Washington, D. C."